United States Patent [19]

Takeuchi et al.

[11] Patent Number: 4,750,161

[45] Date of Patent: Jun. 7, 1988

[54] APPARATUS FOR RECORDING AND REPRODUCING OPTICAL INFORMATION

[75] Inventors: Toyoaki Takeuchi, Ina; Yoshiaki Ikeda, Hachioji, both of Japan

[73] Assignee: Olympus Optical Company Limited, Tokyo, Japan

[21] Appl. No.: 856,949

[22] Filed: Apr. 28, 1986

[30] Foreign Application Priority Data

Apr. 30, 1985 [JP] Japan .................. 60-92849

[51] Int. Cl.⁴ .............................. G11B 7/095
[52] U.S. Cl. ...................... 369/45; 369/44; 369/116; 365/120
[58] Field of Search ........ 365/120, 121, 122; 369/44, 45, 116

[56] References Cited

U.S. PATENT DOCUMENTS

| 3,702,465 | 11/1972 | Cricchi | 365/122 |
| 4,344,165 | 8/1982 | Akiyama | 369/44 |
| 4,611,317 | 9/1986 | Takeuchi et al. | 369/44 |
| 4,614,863 | 9/1986 | Sato | 369/44 |
| 4,660,189 | 4/1987 | Tsukamura et al. | 369/116 |
| 4,683,560 | 7/1987 | Takeuchi et al. | 369/45 |

FOREIGN PATENT DOCUMENTS 57-33441 2/1982 Japan ...................... 369/44

Primary Examiner—Terrell W. Fears
Attorney, Agent, or Firm—Robert E. Burns; Emmanuel J. Lobato

[57] ABSTRACT

An apparatus for recording and reproducing optical information is disclosed. The apparatus comprises a light source, an information recording medium for recording, reproducing, and erasing an information optically with a light beam emanated from the light source, an light output detecting means arranged to receive a part of a light output from the light source for monitoring the light output thereof, at least one reflected light detecting means for detecting light reflected from the surface of the recording medium, a light output controlling means for controlling the light output of the light source by adjusting drive current of the light source in accordance with an output signal from the light output detecting means, a light beam controlling means for controlling focusing and tracking for the recording medium in accordance with an output signal from the reflected light detecting means, and a controlling amount adjusting means for adjusting controlling amount of the light output controlling means and the light beam controlling means in accordance with a positional information in radial direction of the recording medium for the light beam.

4 Claims, 5 Drawing Sheets

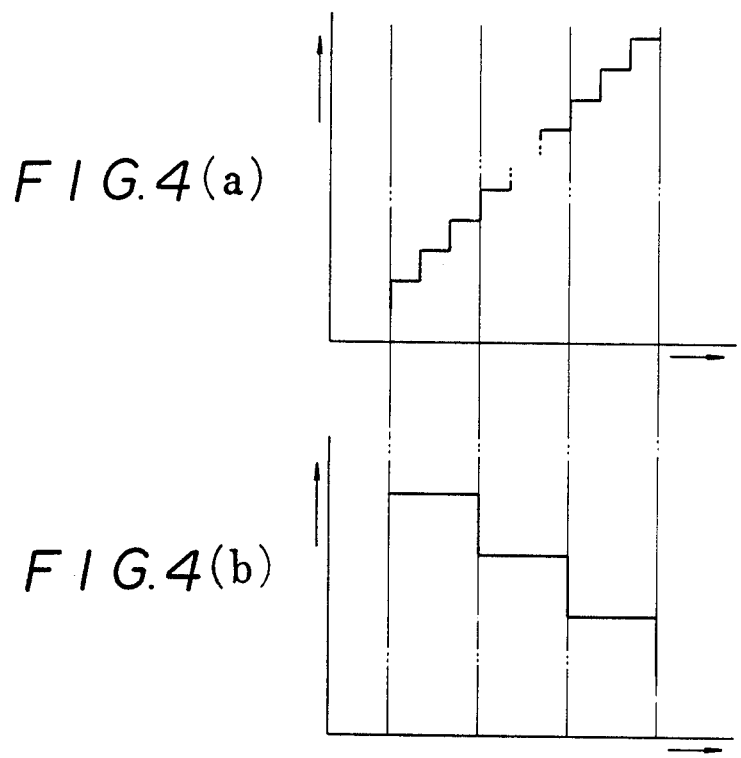
FIG.4(a)
FIG.4(b)
FIG.5
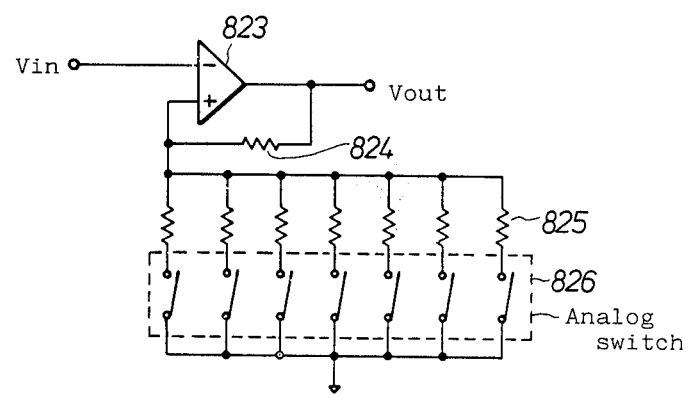

APPARATUS FOR RECORDING AND REPRODUCING OPTICAL INFORMATION

BACKGROUND OF THE INVENTION

The present invention relates to an optical information recording and reproducing apparatus for recording, reproducing and erasing required information optically by an irradiating light beam emanated from a light source, such as a semiconductor laser onto an information recording medium, and particularly to an apparatus for recording and reproducing optical information in which light output from the light source is most suitably adjusted in accordance with each operation mode of recording, reproducing and erasing and a focussing control (focus adjustment) and/or a tracking control (positional adjustment of light beam for tracking a track of the information recording medium) is most suitably performed.

In optical information recording and reproducing apparatus for recording, reproducing and erasing required information on the information recording apparatus by scanning a light beam from a light source on the information recording medium (referred to as a disc) as a spot light, the light quantity control of the light source is inevitable in order to perform a stable operation at each mode of recording, reproducing and erasing. Particularly, in an optical disc utilizing a disc-shaped information recording medium, there has been proposed a system for automatically adjusting light intensity in accordance with a position of the light beam to a radial direction of the disc (referred to as an automatic power control), since a relative rotation speed to the light beam irradiated on to the information recording medium is different at an inner periphery portion and an outer periphery portion of the disc which rotates with a certain rotational speed (refer to, for example, Japanese Patent Laid-open No. 59-146,457).

In order to perform optimum focus adjustment and positional control of the light beam to the track, there have been proposed a focussing control and a tracking control in which the light reflected from or transmitted through the optical disc (hereinafter referred to as a return light) is detected by a light detector which is divided into four equal portions, to obtain an error signal, thereby shifting lens position or optical pick-up through a closed servo loop. In such a control of the light beam due to the closed servo loop, however, contamination or deterioration of optical components or parts such as, for example, lens or mirror affects a level of the detected return light so that the level of the error signal is changed resulting in a change in a total gain of a control loop and thus a followability of the servo control becomes bad or an oscillatory phenomena arises resulting in a cause of unstable operation. In an optical disc having a specidal construction such as a groove structure or pit structure in which a groove shaped track is previously provided on the optical disc, the same phenomena causes a change in light quantity of the return light. Then, it has been proposed an automatic gain control system in which the return light is detected and a circuitry gain in the focussing loop is changed in accordance with the total detected light quantity, thereby absorbing a change in total gain caused by the contamination and deterioration of optical components (for example, refer to Japanese Patent Laid-open No. 56-148,745).

As described above, according to the prior art, the control loop for performing the focussing control or the tracking control consists of a closed servo loop in which the return light from the optical disc is detected, the gain of the control loop is adjusted on the basis of the detected signal level, and the level of the lens drive signal or the optical pick-up drive signal is adjusted thereby performing the focussing control or the tracking control. In this case, for example, when the light beam is shifted from the inner periphery portion to the outer periphery portion of the optical disc on the basis of the external instruction, the automatic power control device receives the positional signal corresponding to the radial position of the disc thereby increasing the light output level of the light source with good responsibility, but the servo loop for the focussing and tracking control adjusts the total gain thereof only after the return light is detected in accordance with the light quantity increased by the automatic power control device thereby performing the focussing and tracking control. At the time the light beam has been shifted in the radial direction of the disc, the gain of the servo loop is not yet adjusted completely so that it is difficult and unstable to perform correct focussing and tracking to the desired or aimed track and under certain circumstances it is impossible to perform tracking due to the oscillation.

SUMMARY OF THE INVENTION

It is an object of the present invention to provide an apparatus for recording and reproducing optical information capable of stable control of the light beam by resolving the above conventional problems.

According to the present invention there is provided an apparatus for recording and reproducing optical information comprising a light source, an information recording medium for recording, reproducing, and erasing an information optically with a light beam emanated from the light source, a light output detecting means arranged to receive a part of a light output from the light source for monitoring the light output thereof, at least one reflected light detecting means for detecting light reflected from the surface of the recording medium, a light output controlling means for controlling the light output of the light source by adjusting drive current of the light source in accordance with an output signal from the light output detecting means, a light beam controlling means for controlling focusing and tracking for the recording medium in accordance with an output signal from the reflected light detecting means, and a controlling amount adjusting means for adjusting the controlling amount of the light output controlling means and the light beam controlling means in accordance with a positional information in a radial direction of the recording medium for the light beam.

The information recording medium is a light disc.

The controlling amount adjusting means comprises first controlling amount adjusting means for adjusting the controlling amount of the light output controlling means and second controlling amount adjusting means for adjusting the controlling amount of the light beam controlling means.

The second controlling amount adjusting means comprises two light beam controlling amount adjusting means, one being a focusing control and the other being a tracking control.

BRIEF DESCRIPTION OF THE DRAWINGS

FIG. 4 comprised of FIGS. 4a and 4b is an explanatory view illustrating the operation of the apparatus shown in FIG. 3;

FIG. 5 is a circuit diagram showing an automatic gain control device used in the apparatus according to the present invention;

DESCRIPTION OF THE PREFERRED EMBODIMENT

Referring now to FIGS. 1 to 7, there is shown an apparatus for recording and reproducing optical information according to the present invention.

Figure 1:
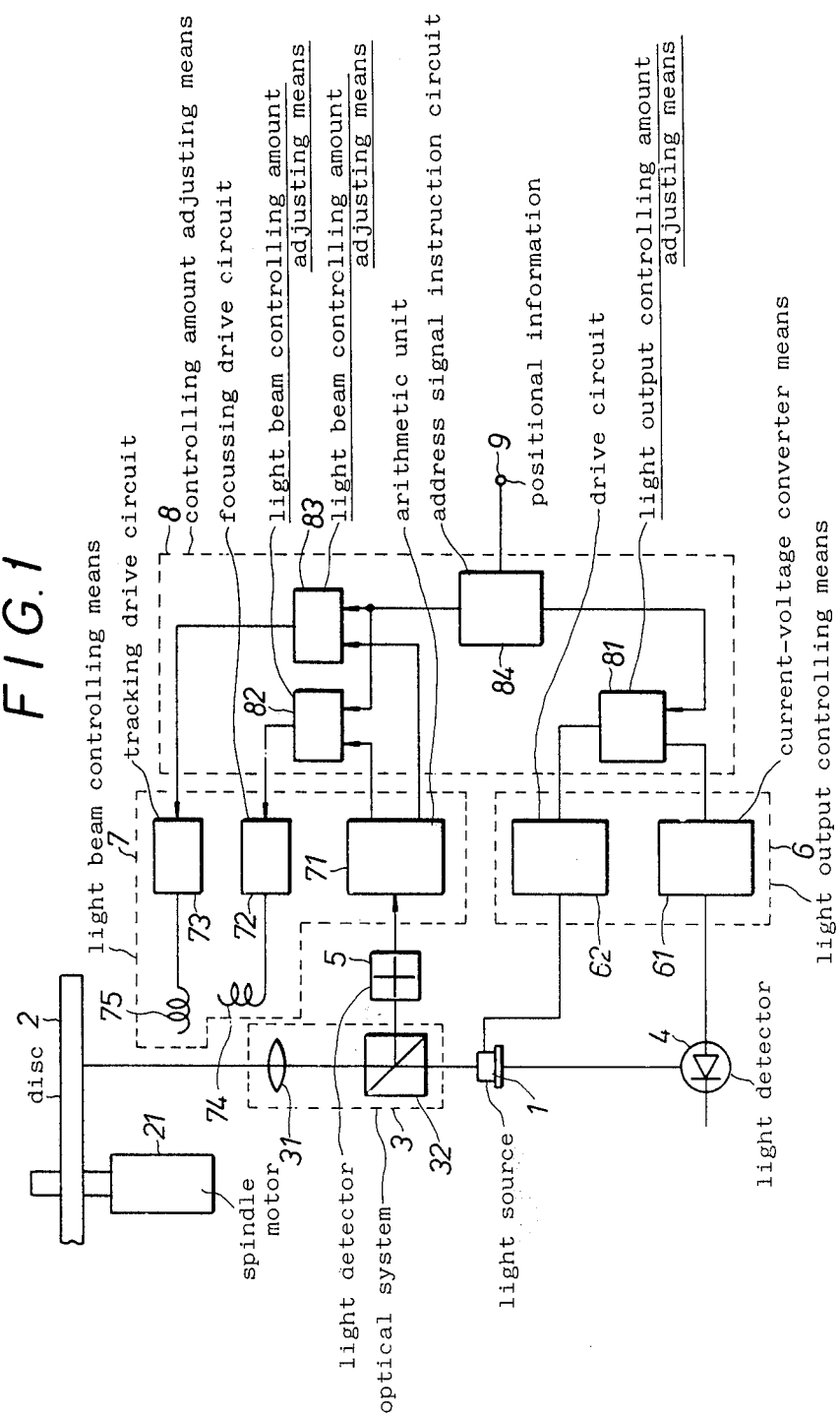
FIG. 1 is a schematic view showing a construction of a fundamental conception of an optical information recording and reproducing apparatus according to the invention.

As shown in FIG. 1, reference numeral 1 is a light source which generates a light output. The light output is irradiated onto an optical information recording medium 2, such as an optical disc, through an optical system 3. The optical disc 2 is rotated by a spindle motor 21. The optical system 3 comprises an objective lens 31 and a polarizing prism 32. The light output of the light source 1 is monitored by a light detector 4, the output signal of which is supplied to a light output controlling means 6 which controls the light output of the light source 1 in accordance with the output signal of the light detector 4. The light output controlling means 6 comprises a converter means 61 for converting the current output of the light detector 4 into an output voltage and a drive circuit 62 for the light source 1. The light reflected on the optical disc 2 (hereinafter, referred to as a return light) is irradiated onto a light detector 5 which is divided into four equal portions, through the objective lens 31 and the polarizing prism 32. The output signal of the light detector 5 is supplied to a light beam controlling means 7 which generates a focus error signal and a track error signal in accordance with the output signal of the light detector 5 thereby performing focussing control and tracking control of the light beam to the optical disc 2. The light beam controlling means 7 comprises an arithmetic unit 71 including an adder and subtracter, a focussing drive circuit 72 for performing focus adjustment of the objective lens 31, a tracking drive circuit for driving the objective lens 31 and/or a carriage (moving means (not shown) for placing the optical system 3 thereon), a focussing coil 74 and a tracking coil 75 each shifting the objective lens 31. Reference numeral 8 is a controlling amount or controlled variable adjusting means which comprises a light output controlling amount adjusting means 81 for adjusting manipulated variable of the light output controlling means 6, and light beam controlling amount adjusting means 82 and 83 each adjusting manipulated variable of the light beam controlling means 7. The adjusting means 82 is intended for the focussing control and the adjusting means 83 is intended for the tracking control. The controlling amount adjusting means 8 also comprises an addressing signal instruction circuit, to which an positional information 9 corresponding to the position of light beam in the radial direction of the optical disc 2 is applied. The addressing signal instruction circuit 84 is constructed by a central procssing unit (hereinafter, referred to as CPU).

In operation, the light output of the light source 1 is monitored by the light detector 4. The detected output signal of the light detector 4 is supplied to the light source drive circuit 62, the output signal of which controls the light output of the light source 1, thereby feedback controlling the light source 1. In this case, the manipulated variable of the light output controlling amount adjusting means 81 is variablly adjusted in accordance with the output signal of the addressing signal instruction circuit 84 which receives the positional information thereby large light output from the light source 1, for example, in case of positioning the light beam at the outer periphery portion of the disc 2. The return light of the optical disc 2 detected by the light detector 5 is converted into an error signal by the arithmetic unit 71 of the light beam controlling means 7. The error signal is supplied to the focussing coil 74 and the tracking coil 75, respectively, through the light beam controlling amount adjusting means 82, 83 and the focussing and the tracking drive circuits 72 and 73, respectively, thereby performing focussing control and tracking control of the light beam at the desired position of the disc 2. In this case the manipulated variables of the light beam controlling amount adjusting means 82, 83 are variably adjusted in accordance with the output signal of the addressing signal instruction circuit 84 which receives the positional information 9 thereby decreasing gain of the light beam controlling amount adjusting means 82, 83, for example, in case of positioning the light beam at the outer periphery of the disc 2 resulting in stable focussing control and tracking control.

Figure 2:
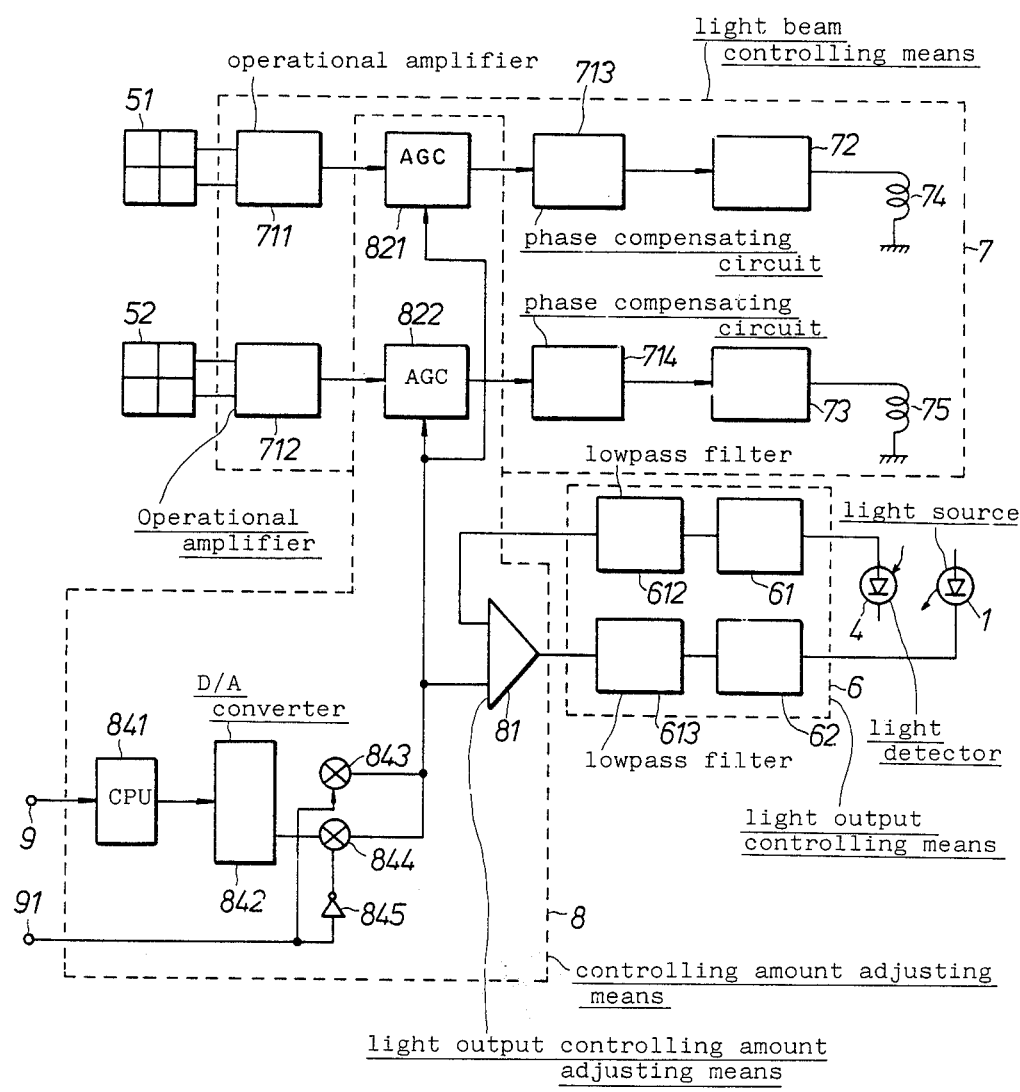
FIG. 2 is a block diagram showing one embodiment of the optical information recording and reproducing apparatus according to the present invention.

FIG. 2 shows one embodiment of the optical information recording and reproducing apparatus according to the present invention. Reference numeral 1 is a light source such as a semiconductor laser and 4 is a light detector of PIN type for detecting the light emanated from the back side of the simiconductor laser 1. 51 is a light detector consisting of four divided portions for detecting the return light from the disc (not shown) thereby effecting the focussing control and 52 is a light detector consisting of four divided portions for detecting the return light thereby effecting the tracking control. 711 and 712 are operational amplifiers being an arithmetic circuit. 821 and 822 are light beam controlling amount adjusting means, such as an automatic gain controlling or adjusting circuit (hereinafter, referred to as AGC), 713 and 714 are phase compensating circuits, 72 and 73 are focussing and tracking drive circuits. The semiconductor laser 4 is connected to the converting means 61 for converting the light detected current signal of the light detector 4 into the voltage signal which is supplied to a comparator circuit 81 being the light output controlling amount adjusting means, through a low pass filter circuit 612. Teh semiconductor laser 1 is connected to the output of the comparator circuit 81 through the drive circuit 62 and the phase compensating circuit 613. The positional information signal 9 corresponding to the position of the light beam on the disc (not shown) is supplied to a CPU 841, the output of which is supplied to a D/A converter 842 as a digital signal in accordance with the light beam position on the disc. The D/A converter 842 generates a large analog signal corresponding to the large light output, for example, at recording and a small analog signal corresponding to the small light output, for example, at reproducing. These signals are supplied to the comparator circuit 81 and AGC circuits 821 and 822 through analog switchs 843 and 844, respectively. Recording operation instruction signals 91 for instructing each operation mode of recording, reproducing and erasing for the optical information recording and reproducing apparatus, and supplied to the analog switch 844 through an inverter 845 and the analog switch 843, respectively, thereby most suitably controlilng or switching these switchs in accordance with respective operation modes of recording, reproducing and erasing. In the present embodiment, the fluctuation in light output of the light source 1 is monitored by the light detector 4 and supplied to the comparator circuit 81 through the converter means 61 and the low pass filter 612. The comparator circuit 81 compares the output of the light detector 4 with a reference signal. The reference signal supplied to the comparator circuit 81 corresponds to the position of light beam on the disc by the positional information 9 and corresponds to the respective operation modes by the recording operation instruction signal 91. The positional information 9 is selected by the analog switches 843 and 844 through the CPU 841 and the D/A converter. In this case the light source 1 is driven and controlled in such a manner that the fluctuation of the light output is compensated by a feedback loop consisting of the light detector 4, the low pass filter 612, the comparator circuit 81 and the drive circuit 62, and the most suitable light output strength may be obtained in accordance with the position of light beam on the disc and the operation mode. That is, when information recording is performed by positioning the light beam at the outer periphery portion of the disc the CPU 841 generates large analog output through the D/A converter 842 in accordance with the positional information 9 and the recording operation instruction signal 91 selects analog switches 843 and 844 in accordance with the modes of recording operation, thereby supplying the reference signal of large level to the comparator circuit 81 so that the light source 1 may be emanated with large output. According to the present invention, in addition to the light output adjustment of the light source, the gain of AGC circuits 821 and 822 is adjusted with the analog output signal selected by the analog switch 843 and 844 (for example, the gain of the AGC circuits 821, 822 is decreased in case of emanating the light source 1 with large light output) so that the gain of the closed servo loop for the focussing and tracking control may be most suitably adjusted in accordance with the position of the light beam on the disc and the operation modes.

According to the present embodiment, the positional information of the light beam and the operation mode information (for example, recording operation instruction signal) can perform an automatic power control in light output of the light source and a focussing adjustment or a postional control of the light beam, so that the total gain of the focussing control loop and the tracking control loop can be automatic-adjusted separately thereby performing stable opertion of optical information recording and reproducing.

Figure 3:
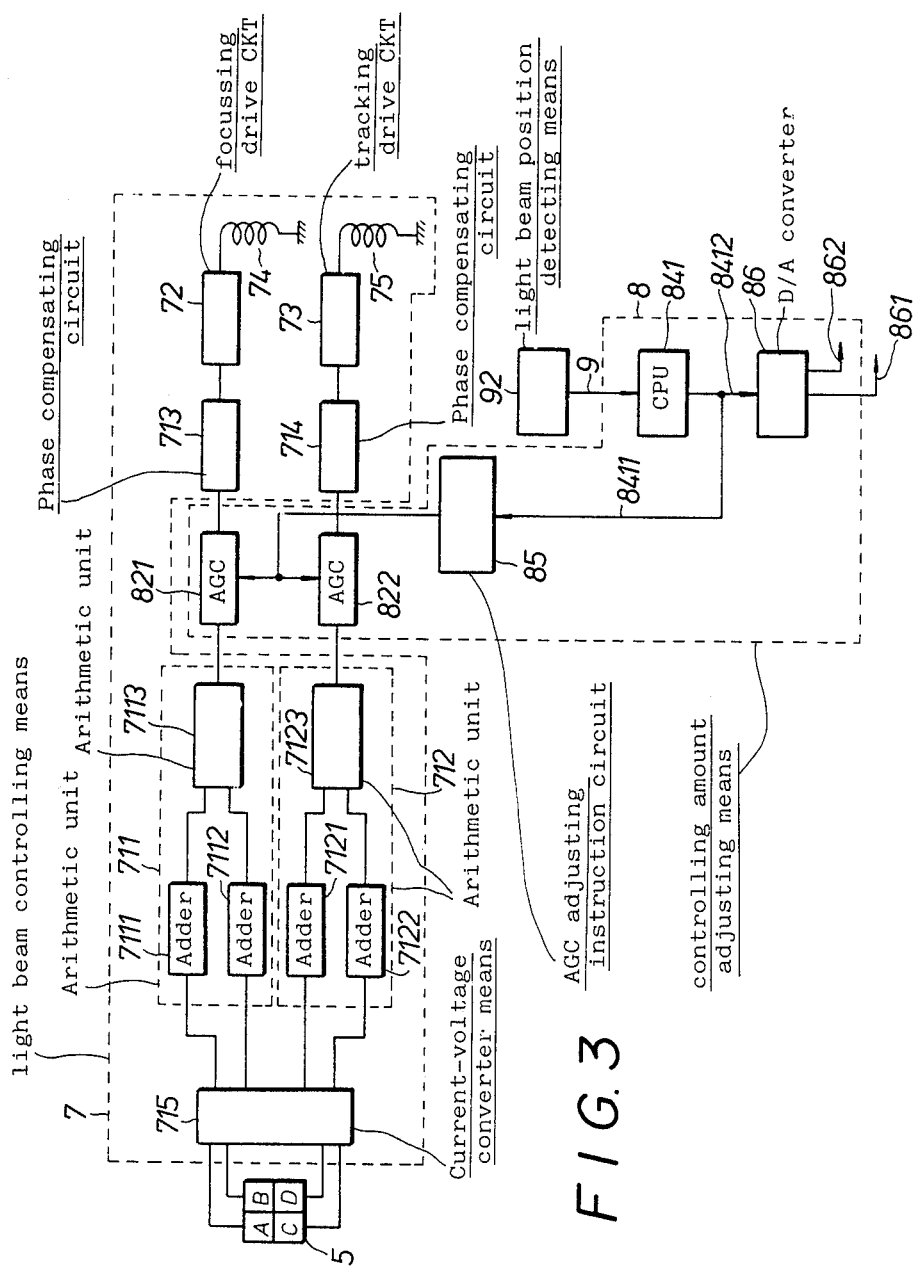
FIG. 3 is a block diagram showing another embodiment of the optical information recording and reproducing apparatus according to the present invention.

FIG. 3 shows another embodiment of the apparatus according to the present invention and FIG. 4 explains the operation thereof. In this embodiment the return light from the optical disc is detected by only one light detector 5 consisting of four divided portions. The light beam controlling means 7 comprises means 715 for converting output current of the light detector 5 into voltage signal and airthmetic circuits 711 and 712 which include, address 7111, 7112 and 7121, 7122 for adding outputs A, B, C and D of respective light receiving elements of the light detector 5 consisting of four divided portions, and arithmetic units 7113 and 7123 for adding and substracting output of the address 7111, 7112, 7121 and 7122. That is, the arithmetic unit 7113 generates an output $(A+B)-(C+D)$ and the arithmetic unit 1123 generates an output $(A+C)-(B+D)$. The light beam controllilng means 7 also comprises phase compensating circuits 713, 714, drive circuits 72, 73 and focussing coil 74 and tracking coil 75. These elements 713, 714, 72, 73, 74, and 75 constitutes closed servo loops for focussing or tracking control together with arithmetic circuits or units 711, 712 and AGC circuits 821 and 822. the controlling amount adjusting means 8 comprises the AGC circuits 821, 822, and AGC adjusting instruction circuit 85, a D/A converter 86 and a CPU 841. The appartus further comprises a light beam position detecting means 92 for detecting the position of light beam in the radial direction of the disc, thereby obtaining the positional information 9 by reading out the address information previously recorded on the track of the disc with the light beam. The positional information 9 is supplied to the CPU 841 which supplies an AGC gain switching instruction signal 8411 of n bits to the AGC adjusting instruction circuit 85. The AGC adjusting instruction circuti 85 comprises a D/A converter and an operation mode selecting switch which operates by the external recording operation instruction signal (not shown). The AGC gain switching instruction signal thus analog converted is supplied to the AGC 821 and 822. The CPU 841 supplies a digital signal 8412 to the D/A converter 86 in accordance with the positional information of m bits. A write instruction signal 861 and an erasing instruction signal 862 analog-converted by the D/A converter 86 are supplied to the comparator circuit (not shown), thereby setting circuit in accordance with respective operation modes at the recording or the erasing of the positional information 9 of light beam and the optical disc device. In the above embodiment it is preferable to set the condition $m>n$.

According to the present embodiment, the CPU 841 being received by the positional information 9 generates the writing instruction signal 861 of m bits and the erasing instruction signal 862 in the radial direction of the optical disc in accordance with the operation mode of the optical disc device and these output signals 861 and 862 are supplied to the comparator circuit of the automatic power control as a reference signal, thereby adjusting the light power of the light source in accordance with the radial direction of the disc and the operation mode of recording or erasing. FIG. 4a shows an explanation of the above described function. In FIG. 4a, the radial direction of the optical disc is plotted in abscissa (the arrow shows the direction from inner periphery to the outer periphery of the disc) and the light output of the light source (write power) which changes with a step of m bits on the optical disc by the write instruction signal 861 through the automatic power control is plotted in ordinate. FIG. 4a also shows one mode of respective modes of recording, reproducing and erasing.

The CPU 841 supplies digital signals 8411 of n bits to the automatic gain control adjusting instruction circuit 85 in accordance with the radial direction of the optical disc, thereby variably adjusting the gain of AGC circuits 821, 822 in the focussing control loop or the tracking control loop.

FIG. 4b shows the relation thereof. In FIG. 4b, the abscissa shows the position of radial direction of the optical disc and the ordinate shows the gain of the AGC circuit. As shown in FIG. 4b, as the position of the light beam shifts toward the outer periphery of the optical disc the gain the AGC circuit becomes decreased with a step of n bits, thereby decreasing the total gain in the closed servo loop of the focussing and the tracking control resulting in a stable servo operation regardless of increase in light output due to the automatic power control. FIG. 4b shows one mode of respective modes of recording, reproducing and erasing.

FIG. 5 shows one embodiment of AGC circuit which comprises an operational amplifier 823, a feed back resistor 824, a plurality of damping resistors 825 and a plurality of analog switches 826 in the ladder form. In this embodiment, the signal corresponding to the position of radial direction of the optical disc is supplied to the analog switches 826, and by selecting any one of the analog switches 826, the operational amplifier 823 amplifies the input signal (Vin) with amplification factor determined by the feed back resistor 824 and the damping resistor 825, thereby generating the output signal (Vout) so that the total gain of the focussing control or the tracking control may be changed by adjusting the amplification factor with the change-over of the switch.

Figure 6:
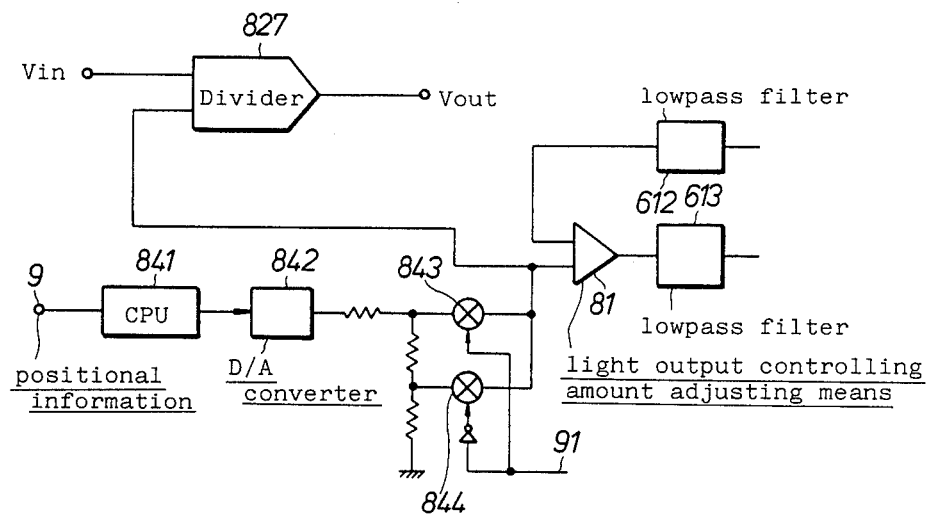
FIG. 6 is a block diagram showing another embodiment of the optical information recording and reproducing apparatus according to the present invention.

FIG. 6 shows another embodiment of the apparatus according to the present invention. In this embodiment, the AGC circuit is formed by a divider 827. The positional information 9 is supplied to the CPU 841. The output signal of the CPU 841 supplied to a comparator circuit 81 as a reference signal through a D/A converter 842, a damping circuit consisting of a combination of resistors, and analog switches 843, 844. these analog switches are selected by a recording operation instruction signal 91 in accordance with the operation modes so that analog signals are supplied to the comparator circuit 81 and the divider 827 in accordance with the position of the light beam on the optical disc and the operation mode. According to the embodiment, the total gain of the AGC circuit for performing light output adjustment of the light source and of the closed servo loop performing the focussing control and the tracking control may be most suitably adjusted in accordance with the position of the light beam on the optical disc and the operation modes recording and reproducing thereby obtaining a stable operation of information recording.

Figure 7:
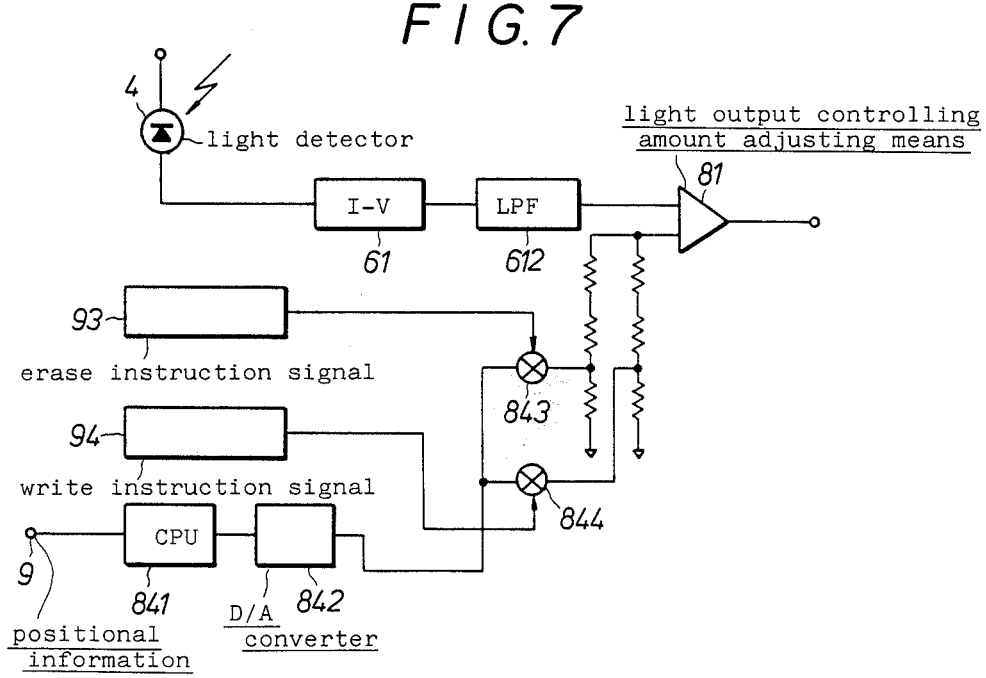
FIG. 7 is a block diagram showing another embodiment of the automatic gain control device used in the apparatus according to the present invention.

FIG. 7 shows another embodiment of the AGC circuit. In this embodiment, the positional information 9 is supplied to the CPU 841. The output signal of the CPU 841 is supplied to analog switches 843, 844 through the D/A converter 842 in accordance with the position of light beam on the disc. An erasing instruction signal 93 and a write instruction signal 94 is supplied to the analog switches 843 and 844, respectively, from a control device such as a general CPU. The output signals of the switches 843 and 844 are supplied to the comparator circuit 81 as a reference signal in accordance with operation modes, thereby controlling or adjusting the light output of the light source together with the output signal of the light detector 4.

What is claimed is:

1. An apparatus for recording and reproducing optical information comprising a light source, an information recording medium for recording and reproducing information optically with a light beam emanated from the light source, light output detecting means arranged to receive a part of a light output from the light source for monitoring the light output thereof, at least one reflected light detecting means for detecting light reflected from the surface of the recording medium, light output controlling means for controlling the light output of the light source by adjusting drive current of the light source in accordance with an output signal from the light output detecting means, light beam controlling means for controlling focusing and tracking for the recording medium in accordance with an output signal from the reflected light detecting means, and means for adjusting said light output controlling means and said light beam controlling means in accordance with positional information in a radial direction of the recording medium for the light beam.

2. An apparatus for recording and reproducing optical information as claimed in claim 1, wherein the information recording medium is a light disc.

3. An apparatus for recording and reproducing optical information as claimed in claim 1, wherein said adjusting means comprises first adjusting means for adjusting the controlling amount of the light output controlling means and second adjusting means for adjusting the controlling amount of the light beam controlling means.

4. An apparatus for recording and reproducing an optical information as claimed in claim 3, wherein said second adjusting means comprises two light beam controlling amount adjusting means, one being a focusing control and the other being a tracking control.

* * * * *